United States Patent [19]

McIntosh et al.

[11] Patent Number: 5,630,042

[45] Date of Patent: May 13, 1997

[54] METHOD AND APPARATUS FOR PROVIDING COLLECTION BROWSERS

[75] Inventors: Heather A. McIntosh, Nahant; Eswar Priyadarshan, Reading, both of Mass.; Alan Ruberg, Foster City, Calif.; Timothy Shea, Charlestown, Mass.

[73] Assignee: Sun Microsystems, Inc., Mountain View, Calif.

[21] Appl. No.: 470,840

[22] Filed: Jun. 6, 1995

(Under 37 CFR 1.47)

Related U.S. Application Data

[63] Continuation of Ser. No. 936,763, Aug. 27, 1992, abandoned.

[51] Int. Cl.$^6$ .................................................... G06F 3/14
[52] U.S. Cl. ........................... 395/155; 395/352; 395/356
[58] Field of Search ................................. 395/145, 146, 395/147, 148, 149, 150, 151, 152, 153, 154, 155, 600, 156, 157, 158, 160

[56] References Cited

U.S. PATENT DOCUMENTS

| | | | |
|---|---|---|---|
| 4,752,889 | 6/1988 | Rappaport et al. | 395/12 |
| 5,109,482 | 4/1992 | Bohrman | 395/154 |
| 5,287,502 | 2/1994 | Kaneko | 395/600 |

OTHER PUBLICATIONS

Simpson, *Mastering WordPerfect 5.1 & 5.2 for Windows*, SYBEX Inc., 1993, pp. 415–430 and 445.

Faison, *Graphical User Interfaces With Turbo C++*, SAMS, 1991, pp. 56–71.

Cowart, *Mastering Windows* 3.0, SYBEX, 1990, pp. 42–44 and 148–149.

Staff, "Wow! Gee Whiz! WordPerfect Goes Windows! A First Look", *Computer Counsel*, v3, n6, Jun. 1991, p.12.

Marmion, abstract of "Windows matures. A look of Windows 3.1" *Computers in Libraries*, vol. 12, No. 6, p. 20, Jun. 1992.

*Microsoft Windows 3.1 Programmer's Reference*, Microsoft Corporation, 1992, pp. 140–158.

*Primary Examiner*—Heather R. Herndon
*Assistant Examiner*—Stephen Hong
*Attorney, Agent, or Firm*—Blakely Sokoloff Taylor & Zafman LLP

[57] ABSTRACT

In a window and notification based computer system, a browser class, a browser item layout class, a browser item data cell layout class and a browser item class are provided to the window object class hierarchy for applications to provide collection browsers on a display. An application provides a collection browser by creating a browser item layout object, zero or more browser item data cell layout objects, a browser object, and zero or more browser item objects as class instances of the four enumerated classes, and providing procedures for servicing events generated by a user interacting with the objects presented in the collection browser using a cursor control device and/or a keyboard. As a result applications may provide collection browsers in a more efficient and consistent manner.

22 Claims, 9 Drawing Sheets

METHOD AND APPARATUS FOR PROVIDING COLLECTION BROWSERS

This is a continuation of application Ser. No. 07/936,763 filed Aug. 27, 1992, which is abandoned.

BACKGROUND OF THE INVENTION

1. Field of the Invention

The present invention relates to apparatus and methods for displaying and manipulating information on a computer system, and more particularly, the present invention relates to a computer controlled display system and method employed on the display system for applications to provide collection browsers having a number of browser items for users' selective browsing.

2. Art Background

Today, many computer systems utilize direct manipulation graphical user interfaces in which many previously coded programming commands are replaced by graphic images, or icons, on a computer display. These graphic images, or icons, symbolically represent a variety of objects or operations the computer system will execute if the graphic images, or icons, are chosen. A user interacts with the computer by choosing and manipulating these graphic images, or icons.

Additionally, many direct manipulation graphical user interfaces utilize multiple windows displayed on the computer display for the applications to convey information to a user. The information is presented in a combination of text and graphics in these windows. Each window may take the form of a variety of objects such as a file folder, loose-leaf binder, or simple rectangle, and the windows may overlap one another with the "top" window fully visible and constituting the current "work file". The user may delete information from a window, move data from one window to another, and generally operate on the window as if an actual file in an office is being used. Thus, the user is permitted to operate on and manipulate the window contents, and the window itself, as if the image constituted an actual object.

For further description of graphical user interfaces, see, D. Robson, "Object Oriented Software System", BYTE, August 1981, p. 74, Vol. 6, No. 8; and L. Tesler, "The Small Talk Environment", BYTE, August 1981, p. 90, Vol. 6, No. 8. See also, U.S. Pat. Re. No. 32,632, reissued Mar. 29, 1988, and assigned to Apple Computer, Inc.; and U.S. patent application Ser. No. 07/323,774, filed Mar. 15, 1989, its corresponding Division and Continuation Applications, Ser. Nos. 07/458,596 and 07/619,665, filed Dec. 26, 1989 and Nov. 28, 1990 respectively, and Ser. Nos. 07/751,866 filed Aug. 28, 1991, now issued as U.S. Pat. No. 5,261,098, assigned to the assignee of the subject application, SUN Microsystems, Inc.

Although the various implementations of direct manipulation graphical user interfaces vary significantly for different machines manufactured by different vendors, the various methods by which a user interfaces with various applications are substantially consistent within a particular implementation. Typically, a window system is provided to facilitate applications in presenting information to the user and receiving inputs from the user, in a manner that is conforming to the particular implementation of direct manipulation graphical user interface. The window system commonly includes a number of window routines for performing various window functions, and a window manager which is given the responsibility of mediating competing demands from the applications for physical resources, such as screen space, color resources, keyboard.

Furthermore, a window toolkit is usually provided to shield the window routines from the application developers and to assist them in varying degrees to conform their applications to the particular implementation. The window toolkit commonly includes a centralized notifier which is given the responsibility of detecting and dispatching events, such as, keys on the keyboard being pressed, "mouse" movements, thereby alleviating the applications of the burden. The applications merely have to provide the various callback procedures for processing the detected events.

For further description of specific implementations of direct manipulation graphical user interfaces, for example, SunWindows™, by SUN Microsystems, Inc., or others by manufacturers such as International Business Machines, and Apple Computer, Inc., and their window systems and toolkits, the reader is directed to technical literature provided by these companies. (SunWindows™, is a registered trademark of Sun Microsystems, Inc.)

Thus it is desirable for the window toolkits to provide specific support for functions that are likely to be implemented in many applications, such as, collection browser. A collection browser is a data pane on which a number of browser items are graphically presented to a user for his selective browsing. Depending on the application, the browser items represented might be, for examples, printers, mail messages, workstations, files or people, and the user might select, "drag and drop" or "double click" on a browser item.

Today, applications typically receive little or no specific support for providing collection browsers. Since each application provides its own support, collection browsers are typically provided in manners that are not as consistent or as efficient as they could be. As will be described, the present invention provides an improved method and apparatus for applications to provide collection browsers in a manner that is more efficient, more consistent and improves over the prior art.

SUMMARY OF THE INVENTION

A method and apparatus for applications to provide collection browsers having a number of browser items for selective browsing by users is disclosed which has application for use in computer controlled display system, and in particular, display systems having direct manipulation graphic user interfaces. A central processing unit (CPU) coupled to a display is provided for executing a window system having a number of window tools and various applications displaying various graphic and text data on the display. The CPU is further coupled to a keyboard and a cursor control device which permit the user to interact with the graphic and other text displayed by selectively positioning a cursor at a desired location on the display, signaling and providing input to the application.

The data and the window operations that can be invoked on the data are organized as window objects having a number of object attributes. The window objects are in turn organized as class instances/classes of a window. A generic (root) class, a window class, a frame class and a canvas class are provided to facilitate general window operations. A browser class, a browser item layout class, a browser item data cell class, and a browser item class are specifically provided to facilitate provision of collection browsers. The browser class is made subclassed to a canvas class. The canvas class and a frame class are in turns made subclassed to a window class. The window class, the browser item layout class, the browser item data cell class, and the browser item class are made subclassed to the generic class. The class instance attributes of the various classes comprise descriptive attributes about the class instances, and processing and manipulating attributes for processing and manipulating the browser items.

The window tools include procedures for creating an object, destroying an object, getting the value of an object attribute, and setting the value of an object attribute. The window tools further include a procedure for detecting and dispatching signals and inputs received by the CPU to the applications. These procedures are organized as class methods of the generic class, thereby inherited by all the subclasses of the generic class.

An application provides a collection browser by creating a browser item layout object, zero or more browser item data cell layout objects, a browser object and zero or more browser item objects, and providing at least one procedure for servicing the detected signals and received inputs dispatched to the application. The browser, the browser item layout, the browser item data cell layout and the browser item objects are created as class instances of the corresponding classes. As a result, applications may provide collections browsers in a manner that is more efficient and more consistent.

BRIEF DESCRIPTION OF THE DRAWINGS

The features and advantages of the present invention will be apparent from the following detailed description of the preferred embodiment of the present invention with references to the drawings in which.

NOTATIONS AND NOMENCLATURE

The detailed description which follows is presented largely in terms of procedures executed on a central processing unit (CPU). These procedural descriptions and representations are the means used by those skilled in the art of computer systems to most effectively convey the substance of their work to others skilled in the art.

A procedure is here, and generally, conceived to be a self-consistent sequence of steps leading to a desired result. These steps are those that require physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, objects, characters, terms, numbers, or the like. It should be borne in mind, however, that all these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operation described herein which form part of the present invention; the operations are machine operations. Useful machines for performing the operations of the present invention include general purpose digital computers or other similar devices. In all cases, it should be borne in mind the distinction between the method operations in operating a computer and the method of computation itself. The present invention relates to method steps for operating a computer in processing electrical or other physical signals to generate other desired physical signals.

The present invention also relates to apparatus for performing these operations. This apparatus may be specially constructed for the required purposes or it may comprise a general purpose computer as selectively activated or re-configured by a computer program stored in the computer. The procedures presented herein are not entirely related to any particular computer or other apparatus. In particular, various general purpose machines may be used with procedures written in accordance with the teaching herein, or it may prove more convenient to construct more specialized apparatus to perform the required method steps. The required structure for a variety of these machines will appear from the description given below.

DETAILED DESCRIPTION OF THE INVENTION

A method and apparatus for applications to provide collection browsers having a number of browser items for selective browsing by users is disclosed which has application to computer controlled display systems, in particular, display systems having direct manipulated graphical user interfaces. In the following description for purposes of explanation, specific applications, numbers, materials and configurations are set forth in order to provide a thorough understanding of the present invention. However, it will be apparent to one skilled in the art that the present invention may be practiced without the specific details. In other instances, well known systems are shown in diagrammatical or block diagram form in order not to obscure the present invention unnecessarily.

General System

Figures 1, 2:
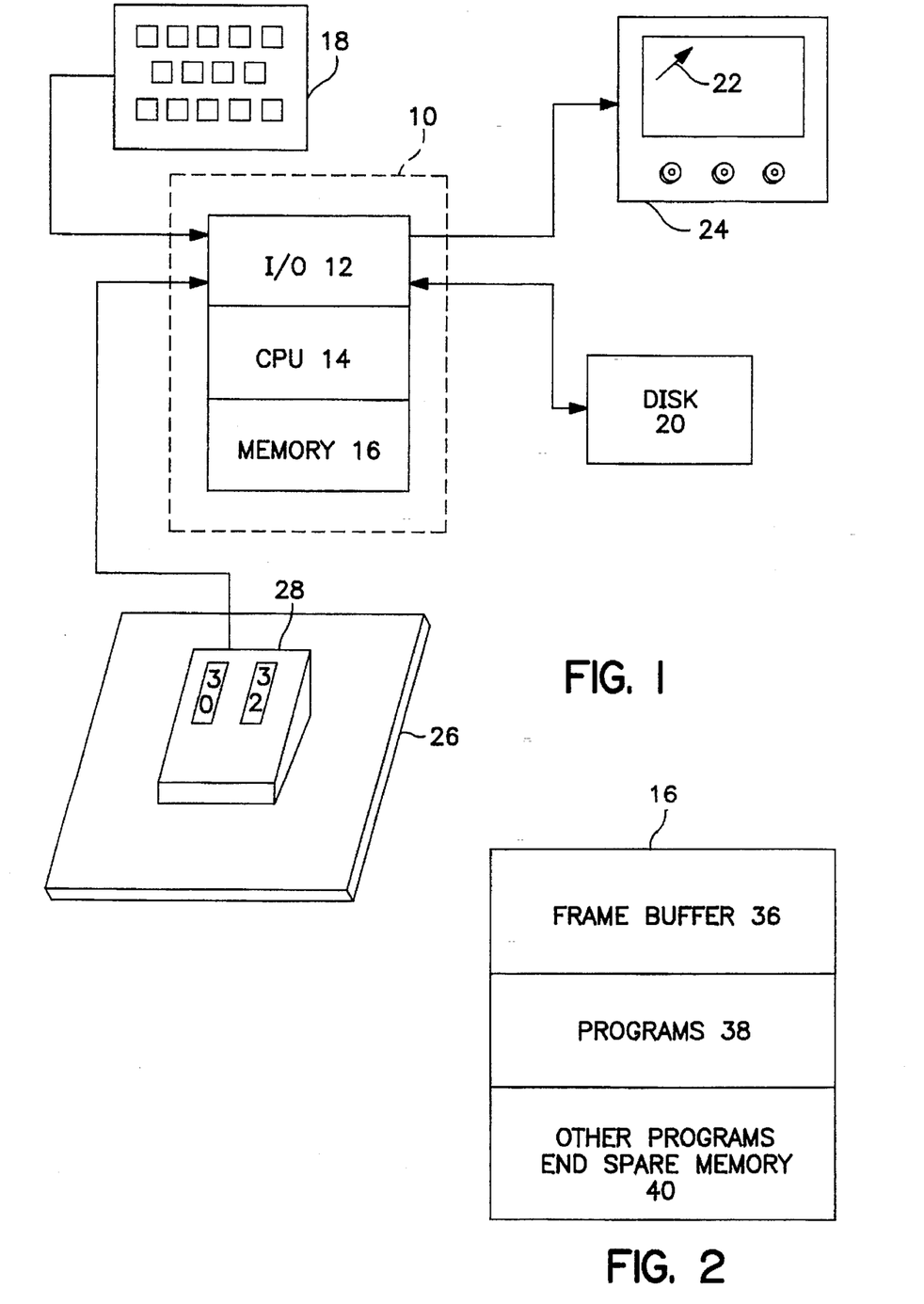
FIG. 1 illustrates the hardware elements of a computer system incorporating the teachings of the present invention.
FIG. 2 shows one arrangement of program storage for the computer system of FIG. 1.

Referring now to FIG. 1, a computer based system for executing applications that provide collection browsers in accordance with the teachings of the present invention is illustrated. Shown is a computer 10 which comprises three major components. The first of these is an input/output (I/O) circuit 12 which is used to communicate information in appropriately structured form to and from other portions of the computer 10. In addition, the computer 10 includes a central processing unit (CPU) 14 coupled to the I/O circuit 12 and a memory 16. These elements are those typically found in most general purpose computers, and, in fact, the computer 10 is intended to be representative of a broad category of computer systems.

A magnetic disk 20 is shown coupled to the I/O circuit 12 to provide additional storage capability for the computer 10. It will be appreciated that additional devices may be coupled to the computer 10 for storing data such as magnetic tape drives, as well as networks which are in turn coupled to other computer systems. As is well known, the disk 20 may store other computer programs, characters, routines, etc., which may be accessed and executed by the CPU 14.

A raster display monitor 24 is shown coupled to the I/O circuit 12 and is used to display images generated by the CPU 14 in accordance to the teachings of the present invention. Any well known variety of raster (or pixmapped) display may be utilized as display 24. A keyboard 18 is shown coupled to the I/O circuit 12 and is used to input data and commands into the computer 10, as is well known. A cursor control device 28 is also shown coupled to the computer 10 through the I/O circuit 12. The cursor control device 28 (commonly known as a "mouse") permits a user to select various command modes, modify graphic data, and input other data. More particularly, the cursor control device 28 permits a user to selectively position a cursor 22 at any desired location on the display 24 by movement of the cursor control device 28 over a surface 26. The cursor control device 28 also permits the user to provide the CPU 14 with select/unselect as well as other signals using the switches 30 and 32. Any well known variety of cursor control device, such as optical mice, mechanical mice, track balls and joy sticks, may be utilized for the cursor control device 28.

Referring now to FIG. 2, one arrangement of major programs contained within the memory 16 illustrated in FIG. 1 is shown. In particular, there is shown a frame buffer 36, which comprise a pixel map of the display 24. The frame buffer 36 represents the video memory for the display 24, wherein, each storage location in the frame buffer 36 corresponds to a pixel on the display 24. Thus, the frame buffer comprises a two dimensional array of points having known coordinates corresponding to the pixels on the raster display 24. The memory 16 also comprises a variety of programs implemented per the teaching of the present invention 38, as disclosed in this specification, for execution by the CPU 10. Additionally, the memory 16 further comprises other programs for controlling or performing other well known functions and operation on computer systems.

Window System

Figure 3:
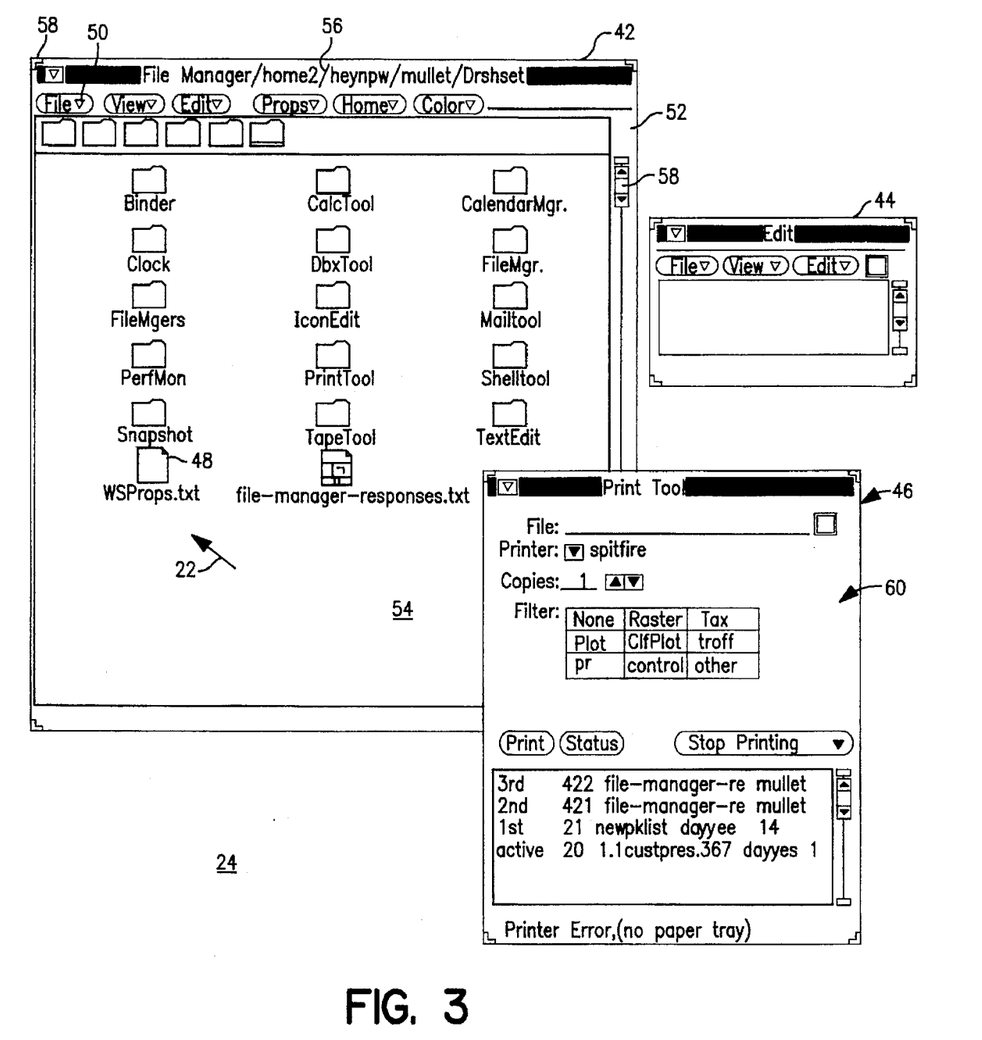
FIG. 3 illustrates display windows displayed on the display screen by the window system for the computer system of FIG. 1.

Referring now to FIG. 3, display windows displayed on the display by the window system of the computer system of FIG. 1 are illustrated. Shown are three display windows 42, 44, and 46, generated and displayed on the display screen 24 by the window system for three exemplary applications, the File Manager, the Text Editor and the Print Tool. These display windows 42, 44 and 46 divide the display screen 24 into three independent input and output areas. While only one display window is illustrated for each of the exemplary application, each application needs not (and in fact usually does not) consist of only a single display window. Any part of an application can have its own separate display window.

The window system accepts user inputs from any one of the display windows 42, 44 or 46 and forwards them to the display window's application for processing. A user may provide input to any one of the exemplary applications by positioning the cursor 22 at certain graphics displayed on the exemplary application's display window, 42, 44 or 46 using the cursor control device (FIG. 1, ref. 28) and signaling the particular exemplary application using the switches (FIG. 1, ref. 30 and 32) on the cursor control device. The user may select an object or a menu of one of the exemplary applications by placing a select switch (FIG. 1, ref. 30) in a select position while the cursor 22 is positioned over a portion of the object's icon, e.g. 48, or the menu's button image, e.g. 50. The user may "activate" an object of one of the exemplary applications by "double clicking" the select switch while the cursor 22 is positioned over a portion of the object's icon, e.g. 50. The user may "drag" an object of one of the exemplary applications by holding down the select switch while the cursor 22 is being repositioned after selecting the object, e.g. 50, and "drop" the object by releasing the select switch once the cursor 22 has been repositioned to the "drop point".

A user may also provide input to one of the exemplary applications through the keyboard (FIG. 1, ref. 18) after "activating" its display window, 42, 44 or 46 for keyboard focus. In its presently preferred form, keyboard focus is implemented with the "click to type" approach, that is by "clicking" a keyboard focus switch (FIG. 1, ref. 32) after positioning the cursor 22 over a portion of the exemplary application's display window 42, 44 or 46 using the cursor control device.

Continuing to refer to FIG. 3, each of three display windows, e.g. 42, comprises a base frame, e.g. 52, and a canvas, e.g. 54. The base frame 52 of the File Manager display window 42 forms the "perimeter" of the File Manager display window 42. The base frame 52 comprises a title message 56, a vertical scrollbar 58, a plurality of resize corners, e.g. 59, and a plurality of menu buttons, e.g. 50. The canvas 54 of the File Manager display window 42 forms the "interior" of the File Manager display window 42 where text and graphic data are displayed. As illustrated by the frame 52 of the File Manger display window 42 and the frame 60 of the Print Tool display window 46, frames may overlap each other when displayed on the display screen. While only one canvas is illustrated for each of the display windows 42, 44 or 46, each display window may contain multiple canvases. However, unlike frames, canvases within a frame do not overlap, they are "tiled" over the display screen space enclosed by the frame.

Figure 4:
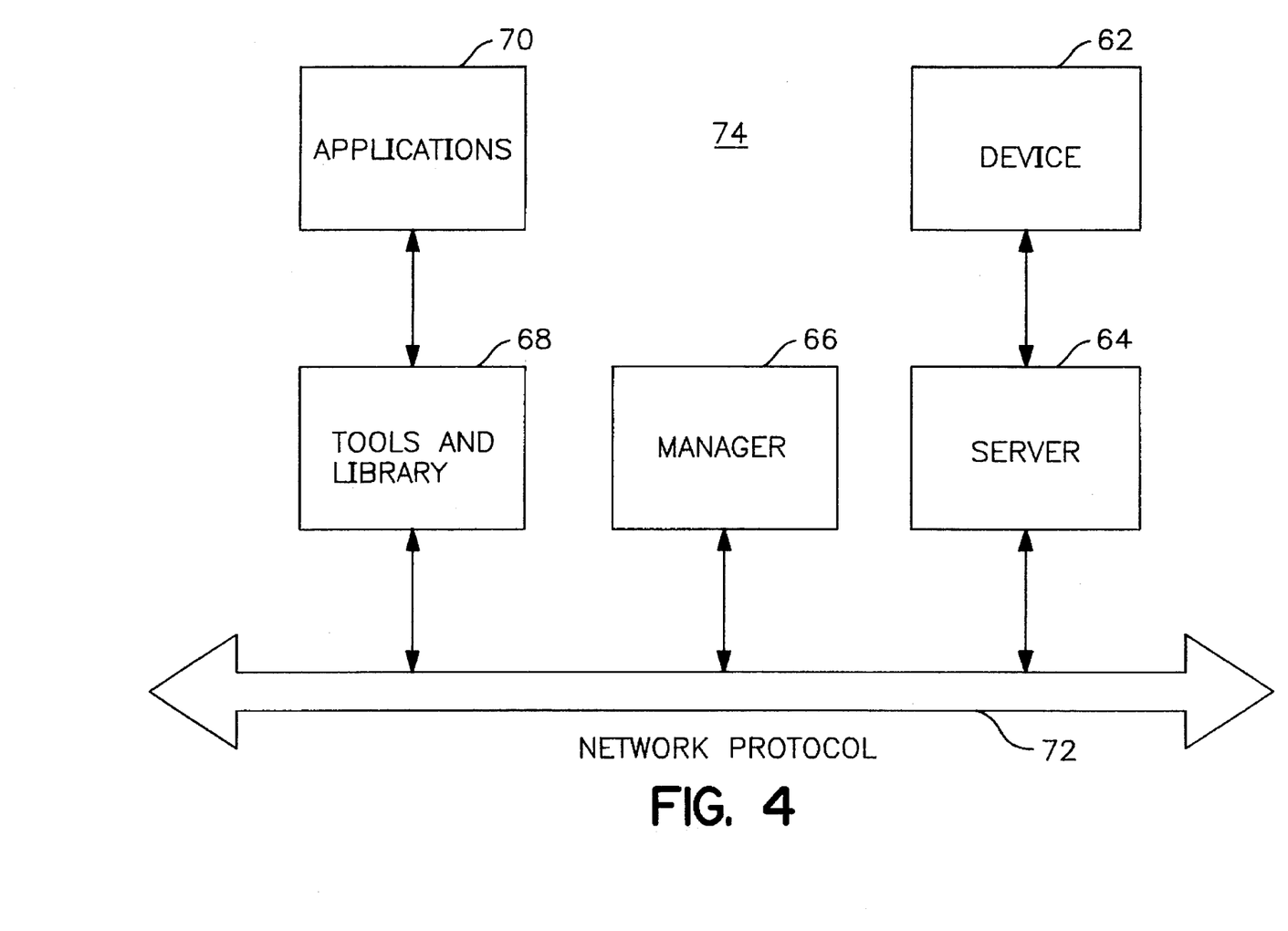
FIG. 4 shows the preferred architecture of the window system for the computer system of FIG. 1.

Referring now to FIG. 4, the preferred architecture for the window system of the computer system of FIG. 1 is shown. In its presently preferred form, the window system comprises of a server 64, a window manager 66, and a set of window tools having a library of associated routines 68, communicating with each other based on a pre-defined network protocol 72, that is a pre-defined set of requests and replies instead of system specific procedure calls. As a result, applications may be executed on one machine and displayed on another.

The server 64 controls a user's device resources 62, such as the keyboard, the display screen, and the cursor control device (FIG. 1, ref. 18, 24, and 28), and making these device resources 62 available to the applications 70. The server 64 performs the following tasks:

Allows access to the display by multiple clients, that is, the window manger 66, the window tools and their associated routines 68.

Interprets network messages from clients and acts on them, for examples, performing two-dimensional drawings or moving windows around.

Passes user inputs to clients by sending network messages known as events, for examples, switches being presses, cursor being repositioned.

Maintains complex data structures, for examples, windows, fonts, thereby relieves the applications 60 from such burdens.

In its presently preferred form, the server 64 comprises a resource database (not shown) for maintaining various data structures including the default values for the various resources and facilitate customization by the applications 70, thereby relieving the applications 70 of the burden of maintaining these complex data structures.

The window manager 66 mediates competing demands for the physical resources of the display screen, for examples, screen space, color resources, and the keyboard. The window manager 66 controls starting of new applications 70, moving windows around on the screen, or resizing them. The window manager 66 also controls much of the visible behavior of the window system, such as overlapping of the windows, and current keyboard focus among the windows. Applications 70 provide the window manager 66 with various information that help the window manager 62 in mediating the competing demands.

The window tools and their associated routines 68 provide various functions to the applications 70 to present information on their display windows and receive inputs from the users. The window tools and their associated routines 68 perform the followings tasks:

Generates and displays window frames.

Generates and displays information on the window canvases.

Translates data structures to protocol events, and sends them to the window manager 66.

Registers application callback procedures.

Receives protocol events from the window manager 66, and notifies the applications 70.

Converts protocol events received to data structures, and sends them to the applications 70.

In its presently preferred form, the window tools 68 comprises a notifier (not shown) for registering applications' callback procedures (not shown), detecting events and dispatching events to the applications 70 for processing, thereby relieving the applications 70 the burden for detecting and dispatching events.

Figure 5:
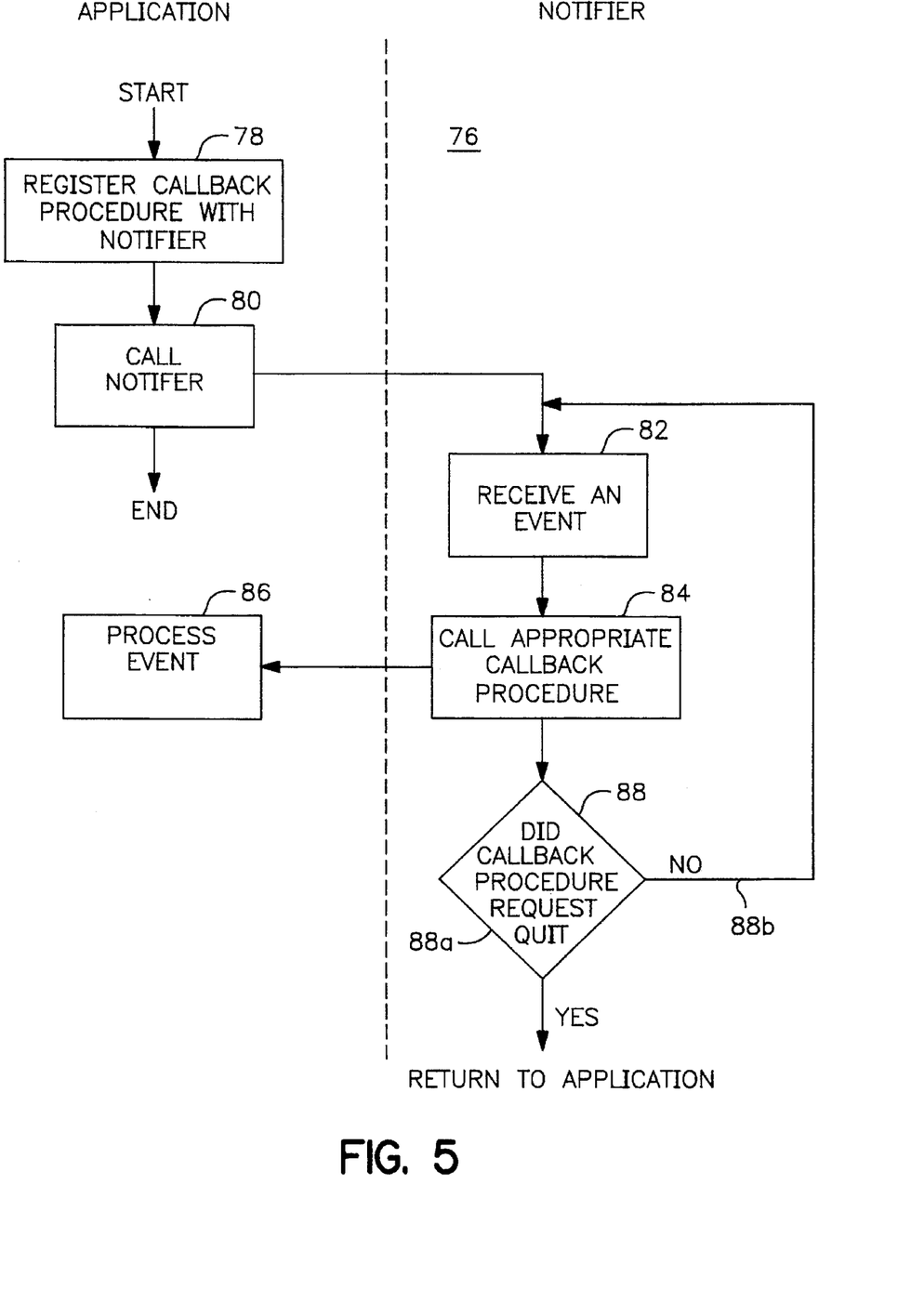
FIG. 5 illustrates the preferred architecture for events handling between an application and the window system for the computer system of FIG. 1.

Referring now to FIG. 5, the preferred architecture for events handling between an application and the window system of the computer system of FIG. 1 is illustrated. In its presently preferred form, an application registers callback procedures with the notifier of the window tools for events the application are interested in, block 78. The application then calls the notifier to monitor events on its behalf, block 80. Upon detection of an event, block 82, the notifier calls the appropriate registered callback procedure, block 84, to process the detected event, block 86. If the callback procedure is registered with a quit request for the detected event, branch 88a, the notifier returns to the application, otherwise, branch 88b, the notifier continues to monitor events on behalf of the application.

The server 64 including the resource database, the window manager 66, the window tools and their associated routines 68 including the notifier, and the network protocol 62 may be implemented with any server, window manager, window toolkit/library, and network protocol of any of the well known window systems provided they are compatible with each other, for example, the server, the window manager, the XView™ Toolkit, Xlib library and X Protocol of the X Window System. For further descriptions of the server, the window manager, the XView Toolkit, Xlib library and X Protocol of the X Window System, see *The Definitive Guides to the X Window System*, Volume Zero, *The X Protocol Reference Manual*, Volume 1, *Xlib Programming Manual*, Volume 2, *Xlib Reference Manual*, and Volume 7, *XView Programming Manual*, O'Reilly & Associates, Inc., 1990. (XView™ is a registered trademark of Sun Microsystems, Inc.)

Figure 6:
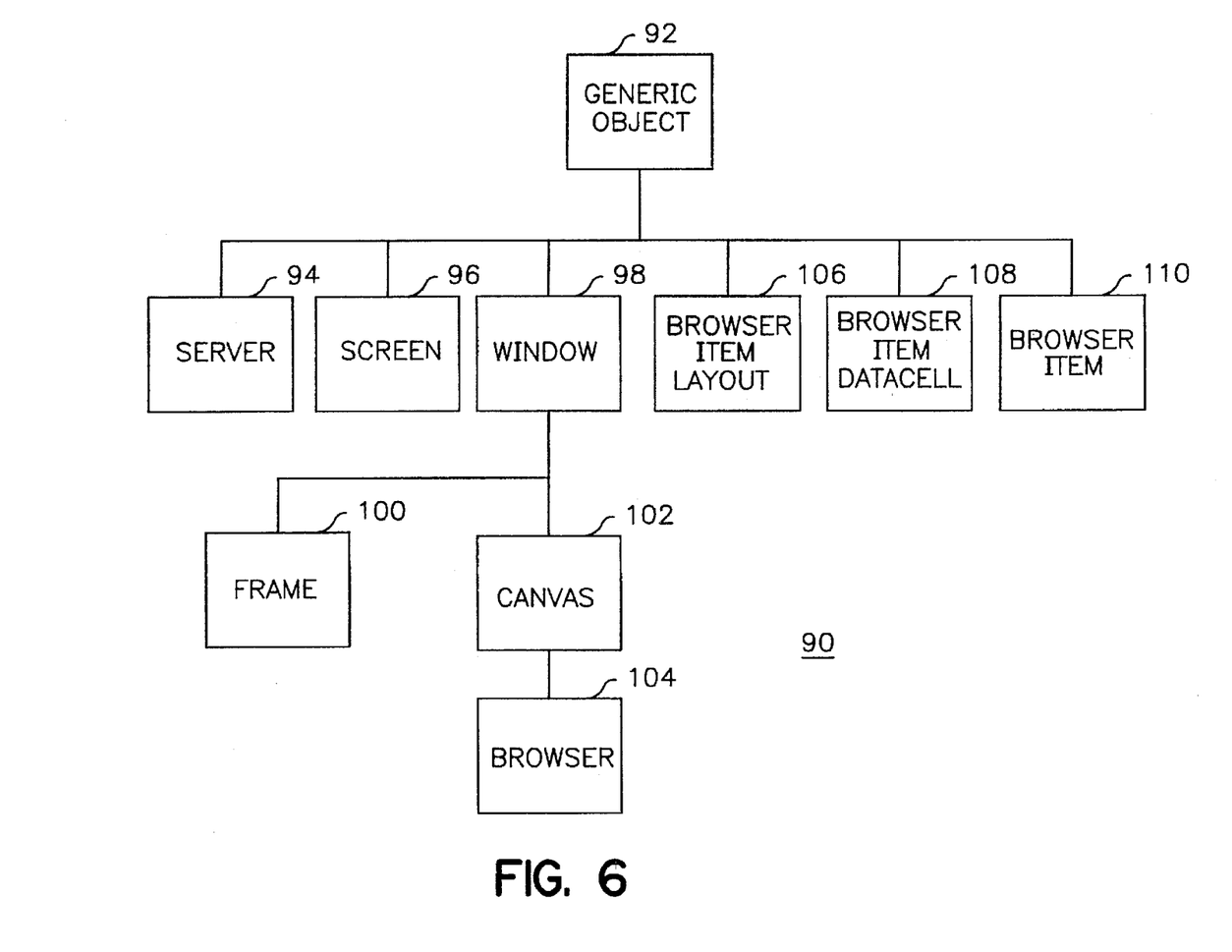
FIG. 6 shows the preferred window object class hierarchy of the window system for the computer system of FIG. 1.

Referring now to FIG. 6, the preferred architecture for the window objects of the window system for the computer system of FIG. 1 is shown. In their presently preferred form, the window data and the window operations that can be invoked on the window data are logically organized as window objects. The window objects are organized as class instances and classes. The data are contained in the class attributes and/or the class instance attributes. These classes and a root class are ordered into a window object class hierarchy 90. The window operations that can be invoked to manipulate the window data are defined in the methods of the classes.

Each class, except the root class, is subclassed to at least one of the other classes, with the subclass inheriting the class methods, class instance attributes and class attributes of those classes it is subclassed to. Those classes are also referred as the super classes of the subclass. A method of a class is invoked on a class or an instance of a class by sending a message comprising the class/class instance, the method and the method's arguments, using a send primitive. Furthermore, in the context of a class method invoking another class method, there is a pseudo class instance/class "Self" and a pseudo class "Super". The pseudo class instance/class "Self" refers to the current class instance/class upon which the invoking class method was invoked. The pseudo class "Super" refers to the invoking class method's super class. For further information on object-oriented design and programming techniques, see B. Meyer, *Object-oriented Software Construction*, (Prentice Hall, 1988), pp. 65–372.

In its presently preferred form, the window object class hierarchy 90 comprises a generic class 92 as the root class. The class hierarchy 90 further comprises a server class 94, a screen class 96 and a window class 98 subclassed to the generic class 92; a frame class 100 and a canvas class 102 subclassed to the window class 98. Additionally, the class hierarchy 90 comprises a browser class 104 subclassed to the canvas class 102; a browser item layout class 106, a browser item data cell class 108 and a browser item class 110 subclassed to the generic class 92.

The generic class 92 is a hidden class, that is instances of this class are not explicitly created, they are implicitly created when instances of the generic class, subclasses are created. In its presently preferred form, the class instance attributes of the generic class 92 comprise an object name attribute, an object font attribute, an object height attribute and an object width attribute. Furthermore, the generic class 92 comprises an initialization method, an object creation method, an object destroy method, an object find method, an object attribute get method, and an object attribute set method. The initialization method when invoked establishes connection to the server (FIG. 4, ref. 64), initializes the resource database of the server, and initializes the notifier of the window tools (FIG. 4, ref. 68). The create method when invoked creates an object as an instance of a class, for example, a frame object as a class instance of the frame class. The destroy method when invoked destroys an object by eliminating a class instance, for example, a canvas class instance of the canvas class for a canvas object. The find method when invoked finds an object that meets certain criteria, or if the object doesn't exist, creates the object as the create method. The object attribute get and set methods when invoked gets and sets object attributes respectively.

The server class 94 is a non-visual class, that is a class instance of the server class does not get displayed. A server class instance is the window system's internal representation of a connection to a server (FIG. 4, ref. 64). Similarly, the screen class 96 is also a non-visual class. A screen class instance is the window system's internal representation of a display screen (FIG. 1, ref. 24) under the control of a server. In it presently preferred form, the class instance attributes of the screen class 86 comprise a screen number attribute and a screen server attribute.

The window class 94, similar to the generic class 92, is also a hidden class. A window class instance is the window system's internal representation of a display window (e.g. FIG. 3, ref. 42) displayed on a display screen. In its presently preferred form, the window class 94 comprises a plurality of methods for relocating a display window, resizing a display window and communicating with the window manager (FIG. 4. ref. 66). Furthermore, the class instance attributes of the window class 94 comprise a window background color attribute, a window foreground color attribute, a window depth attribute, a window desired height attribute and a window desired width attribute.

The frame class 100 is a visual class and its class instances are created explicitly. A frame class instance is the window system's internal representation of a display window frame (e.g. FIG. 3, ref. 52). In its presently preferred form, the frames class 100 comprises a set frame (x,y) coordinate method and a get frame (x,y) coordinate method. The set and get frame x,y coordinate methods set and get the (x,y) coordinates of a display window frame on a display screen respectively. Furthermore, the class instance attributes of the frame class 100 comprise a frame background color attribute, a frame foreground color attribute, a frame title attribute, a frame resize attribute, and a frame menu attribute.

The canvas class 102, similar to the frame class 100, is also a visual class, and its class instances are also created explicitly. A canvas class instance is the window system's internal representation of a canvas (e.g. FIG. 3, ref. 54) with a display window frame. In its presently preferred form, the canvas class 102 comprises a canvas paint method, a canvas repaint method and a canvas resize method. The canvas paint and repaint methods when invoked paints and repaints text and graphic data on the canvas respectively. The canvas resize method when invoked resizes a canvas and retiles the canvas over its display window frame. Furthermore, the class instance attributes of the canvas crass 102 comprise a canvas height attribute and a canvas width attribute, and vertical and horizontal scrollbar attributes.

The generic class 82, the server class 84, the screen class 86, the window class 88, the frame class 90 and the canvas class 92 are intended to be similar to those of the many well known object oriented window toolkits, for example, the XView™ Toolkit. For further descriptions of the window object classes of the XView™ Toolkit, see *The Definitive Guides to the X Window System*, Volume 7, *XView Programming Manual*, O'Reilly & Associates, Inc., 1990. The browser class 104, the browser item layout class 106, the browser item data cell class 108 and the browser item class 110 will be discussed in further detail below.

Collection Browser

Figure 7:
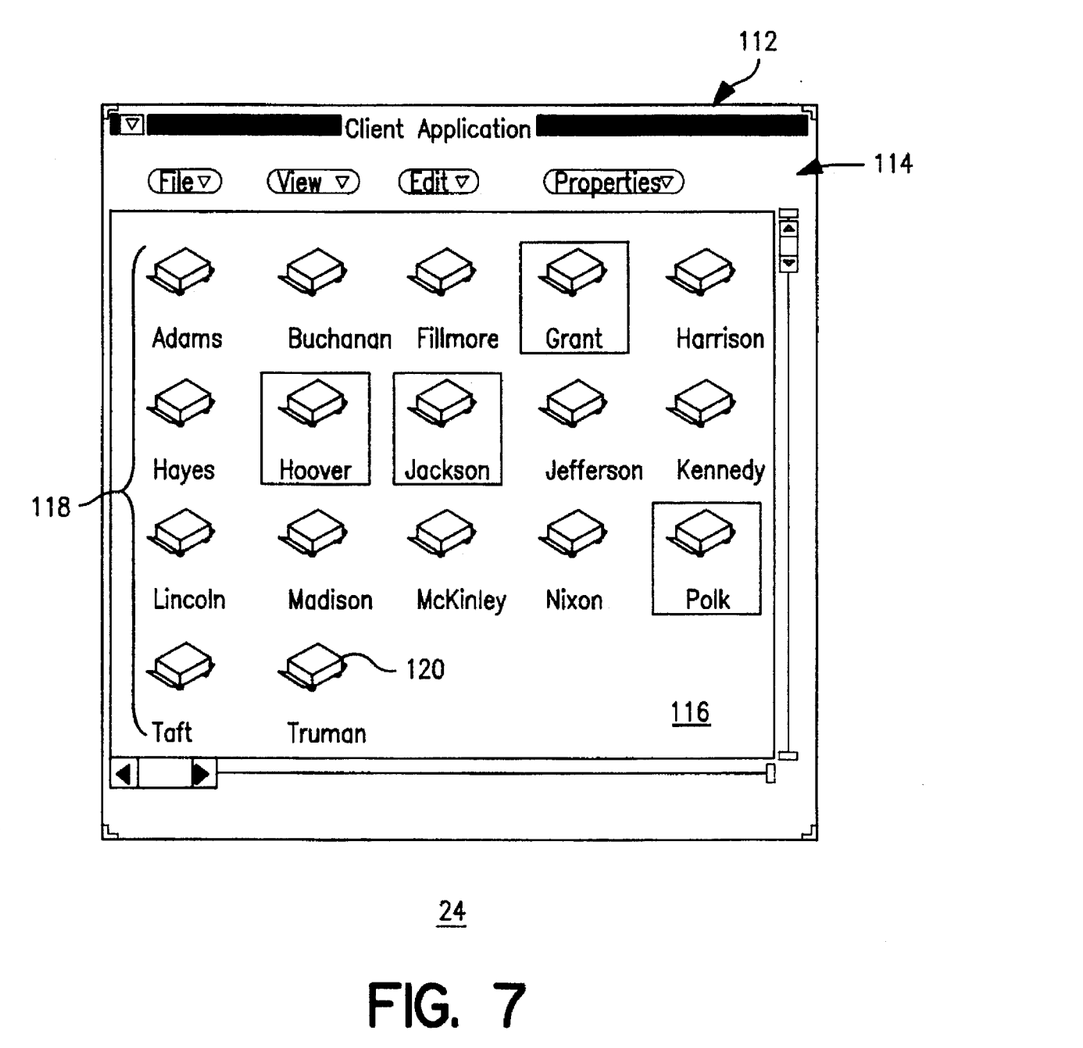
FIG. 7 illustrates the collection browser of the present invention.
Figure 8A:
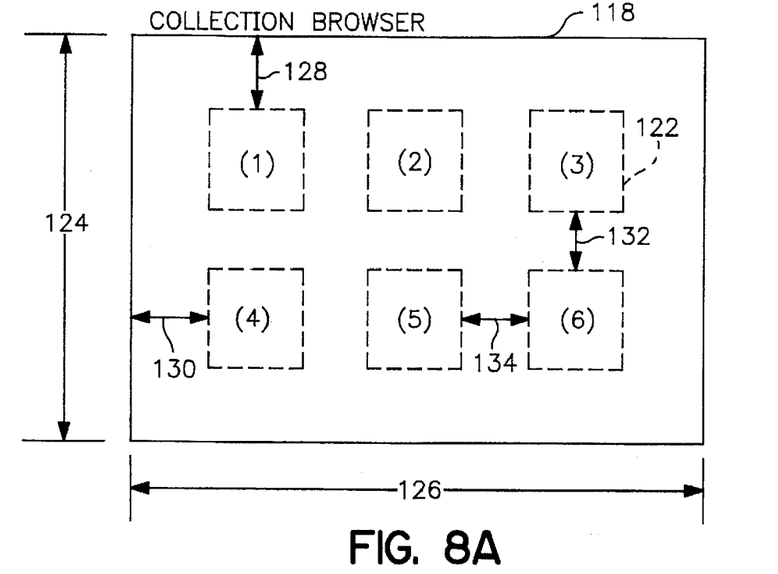
FIG. 8 illustrates the browser, the browser item layout, the browser item data cell and the browser item of the present invention.
Figure 8B:
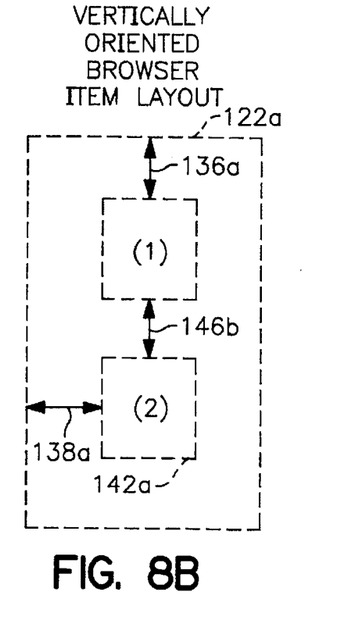
Figure 8C:
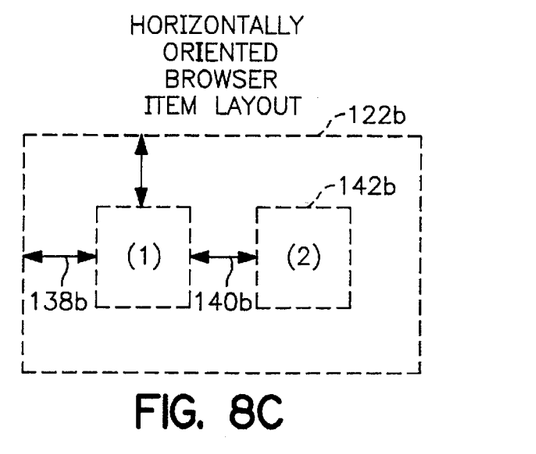
Figure 8D:
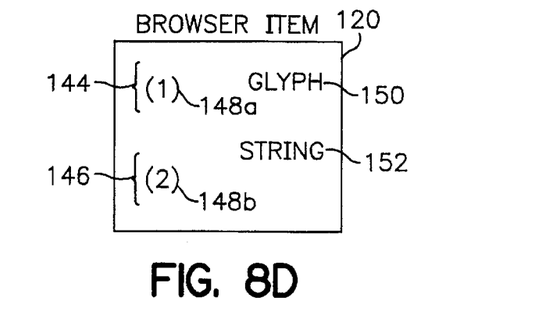

Referring now to FIG. 7, the collection browser of the present invention is illustrated. Shown is an exemplary collection browser 118 painted on the canvas 116 tiled over the display screen space enclosed by the frame 114 of a display window 112. The exemplary collection browser 118 comprises a plurality of browser items, e.g. 120, for a users selective browsing. The browser items, e.g. 120, are organized within the collection browser 118, using a browser item layout and at least one browser item data cell of the present invention, which will be described in further detail below. The user may select, activate, or "drag and drop", a browser item, e.g. 120, using the select switch, the activate switch and the cursor control device as described earlier.

Referring now to FIGS. 8, the browser, the browser item layout, the browser item data cell and the browser item of the present invention are illustrated. In its presently preferred form, the dimensions of a collection browser 118 are controlled either explicitly by the collection browser height 124 and the collection browser width 126 or implicitly by the number of collection browser rows (two shown) and the number of collection browser columns (three shown). The collection browser 118 is partitioned into a plurality of identical browser item layouts, e.g. 122, within which the browser items, e.g. 120, are displayed. The identical browser item layouts are non-overlapping and they are not displayed (i.e. invisible to the user). The positioning of the identical browser item layouts are controlled by the browser top bottom margin 128, the browser left right margin 130, the browser item layout top bottom gap 132 and the browser item layout left right gap 134. The browser items are displayed within the identical browser item layouts from left to right and from top to bottom as denoted by the browser item numbers [1], [2] . . . [n]. While only one browser item layout can be active within the collection browser, different browser item layouts may be created for an application and invoked one at a time by the collection browser at different points in time.

In their presently preferred form, each browser item 120 comprises at least one indexed browser item datum 144 and 146, and each browser item layout 122a or 122b is further partitioned into browser item data cells, e.g. 142a, 142b within which the browser item data 144 and 146 are displayed. The browser item data cells, e.g. 142a, 142b, are also not displayed (i.e., invisible to the user). The browser item data cells, e g. 142a, 142b, may be vertically or horizontally oriented as denoted by the browser item data cell numbers (1), (2) . . . (n) (two shown). The positioning of the browser item data cells, e.g. 142a, 142b, within a browser item layout 122a or 122b, are controlled by the browser item layout top bottom margin 136a or 136b, the browser item layout left right margin 138a or 138b, and the browser item data cell gap 140a or 140b. The browser item data cells may be overlapping, although only non-overlapping browser item data cells are illustrated. The alignment of a browser item datum displayed in a browser item data cell, e.g. 142a or 142b, is controlled by the browser item data cell x-axis alignment and the browser item data cell y-axis alignment.

In its presently preferred form, each indexed browser item datum 144 or 146, may contain non-textual datum (e.g. a glyph) 144 or textual datum 146. Each indexed browser item datum 144 or 146 comprises a browser item datum key 148a, or 148b, and the browser item datum 150 or 152. The browser item datum keys 148a and 148b correspond to their browser item data cells, e.g. 142a or 142b. Furthermore, the browser items may be sorted, assigned to specific browser item layout positions, and manipulated.

Referring back to FIG. 6, in their presently preferred form, similar to other window data, the browsers, the browser item layouts, the browser item data cells and the browser items are logically organized as objects. The browser objects, the browser item layout objects, the browser item data cell objects, and the browser item objects are logically organized as class instances of a browser class 104, a browser item layout class 106, a browser item data cell class 108, and a browser item class 110. As illustrated and described earlier, the browser class 104 is subclassed to the canvas class 102, and the browser item layout class 106, the browser item data cell class 108 and the browser item class 110 are subclass to the generic class 92, thereby allowing the browser objects, the browser item layout objects, the browser item data cell objects and the browser items to inherit the attributes and methods of their super classes.

The browser class 104, similar to the frame class 100 and the canvas class 102, is a visual class. A browser class instance is the window system's internal representation of a collection browser (FIG. 7, ref. 118). The browser class instance attributes of the browser class 104 comprise a browser item layout specification attribute, a browser item layout order attribute, a browser top bottom margin attribute, a browser left right margin attribute, a browser item layout top bottom gap attribute, and a browser item layout left right gap attribute. The browser class instance attributes further comprise a browser pane width attribute, a browser pane height attribute, a number of browser item layout row attribute, a number of browser item layout column attribute and a browser font attribute.

Additionally, the browser class instance attributes comprise a plurality of select and unselect procedure specification attributes, a plurality of drag and drop procedure specification attributes, a double click procedure specification attribute, and a menu procedure specification attribute for specifying the application's callback procedures for handling select/unselect "double click", and "drag and drop" of a browser item, and selection of a menu button. The browser class instance attributes further comprise a browser processing function specification attribute, a browser item sort procedure specification attribute, a browser pre-display canvas painting procedure specification attribute, a browser post-display canvas painting procedure specification attribute, a browser item pointer attribute, and a browser item count attribute, for specifying processing, sorting, pre-painting and post-painting procedures, pointing to a particular browser item, and keeping track of the total number of browser items.

The browser item layout class 106, similar to the server class 94 and the screen class 96, is a non-visual class. A browser item layout class instance is the window system's internal representation of a browser item layout (FIG. 8, ref. 122). The browser item layout class instance attributes of the browser item layout class 106 comprise a browser item data cell orientation attribute, a browser item layout top right margin, a browser item layout left right margin, a browser item data cell gap. Additionally, the browser item layout class instance attributes further comprise a browser item data cell pointer attribute and a browser item data cell count attribute for pointing to a particular browser item data cell, and for keeping track of the total number of browser item data cells.

The browser item data cell class 108, similar to the server class 94, the screen class 96 and the browser item layout class 106, is a non-visual class. A browser item data cell class instance is the window system's internal representation of a browser item data cell (FIG. 8, ref. 142a or 142b). The browser item data cell class instance attributes of the browser item data cell class 108 comprise a browser data cell x-axis alignment attribute, and a browser item data cell y-axis alignment attribute. Additionally, the browser item data cell class instance attributes further comprise a browser item data cell index attribute for indexing a browser item data cell.

The browser item class 110, similar to the frame class 100, the canvas class 102, and the browser class 104, is a visual class. A browser class instance is the window system's internal representation of a browser item (FIG. 7, ref. 120). The browser item class attributes of the browser item class 110 comprise a browser item glyphs attribute specifying at least one browser item key/browser item glyph pair, and a browser item strings attribute specifying at least one browser item key/browser item text string pair. Additionally, the browser item class instance attributes further comprise a browser item index attribute for indexing a browser item.

Figure 9:
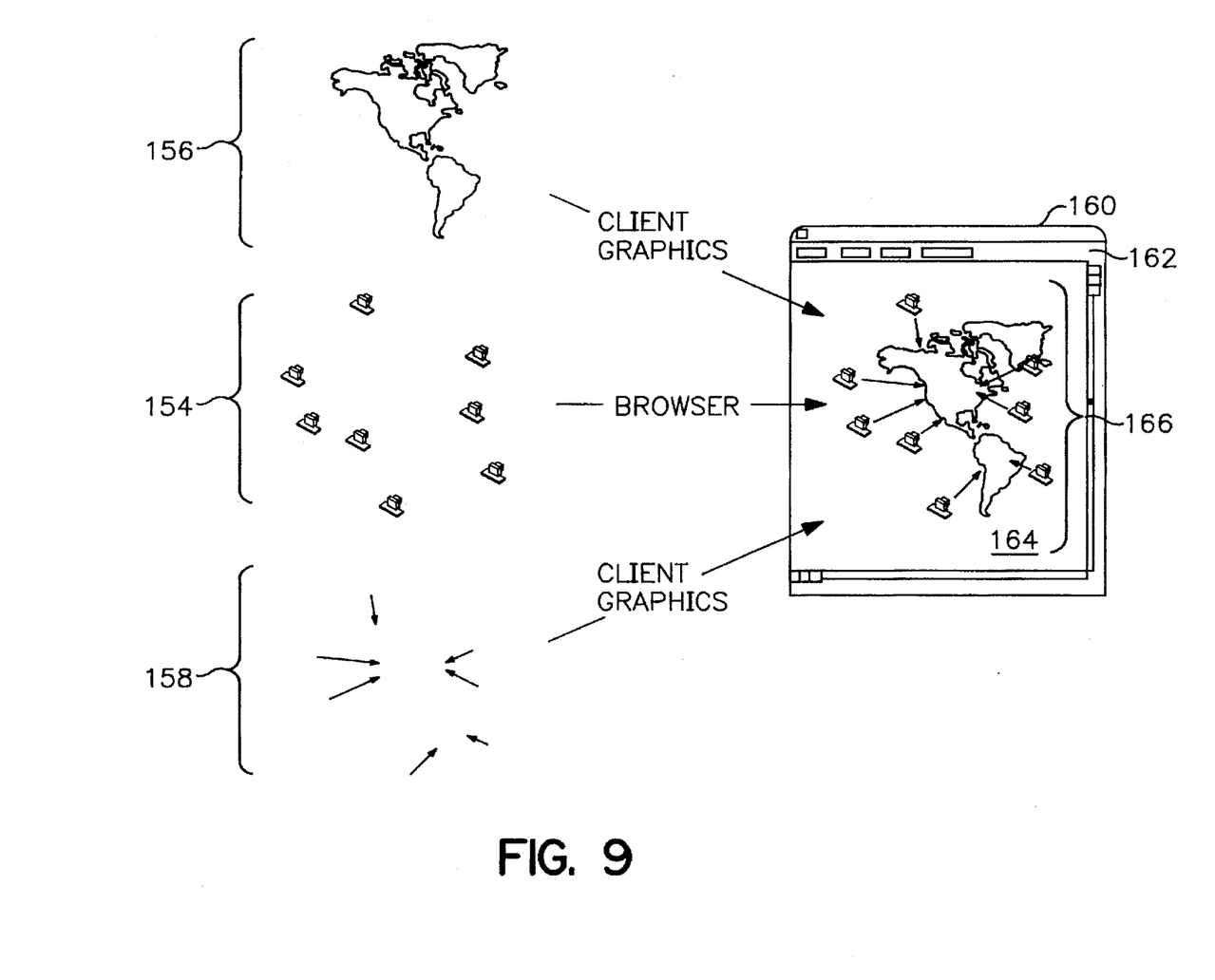
FIG. 9 illustrates a collection browser of the present invention augmented with an application's own graphics.

Referring now to FIG. 9, a collection browser of the present invention augmented with an application's own graphics is illustrated. Shown is a display window 160 comprising a frame 162 and a canvas 164 having a collection browser 166 painted on it. In addition to the browser items 154 painted in accordance to their identical browser item layouts (not shown) and the browser item data cells (not shown), the canvas 164 is also pre-painted and post-painted with an application's graphics 156 and 158.

Figure 10:
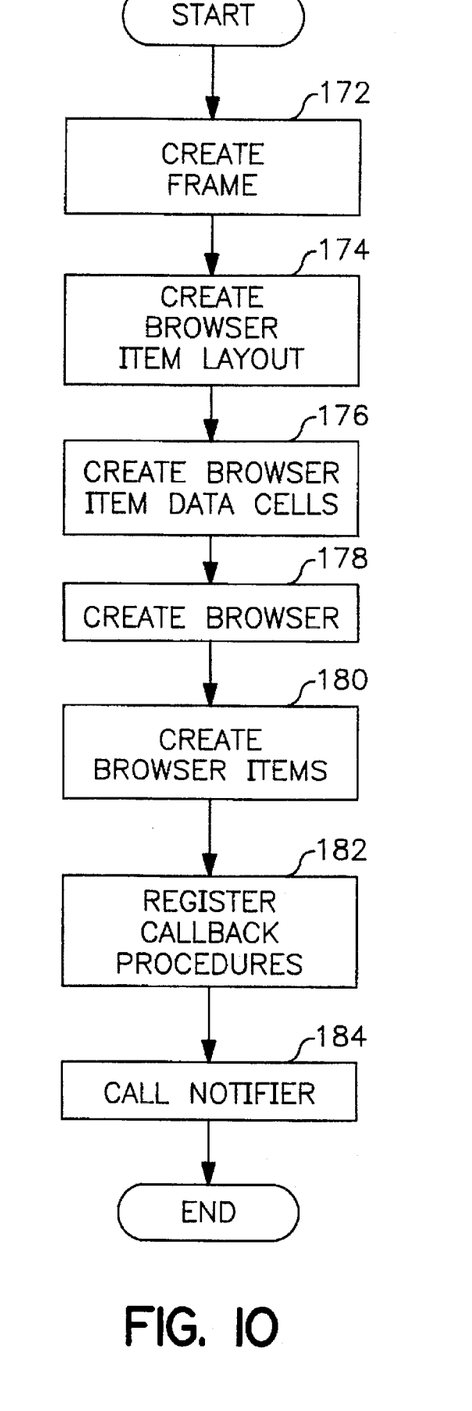
FIG. 10 is a flow chart illustrating the preferred embodiment of the method of the present invention.

Referring now to FIG. 10, a flow chart illustrating the preferred embodiment of the method of the present invention is shown. An application first creates a frame class instance and sets the appropriate frame class instance attributes accordingly, blocks 172. The application then creates a browser item layout class instance and at least one browser item data cell class instance, and sets the appropriate browser item layout class instance attributes and browser item data cell class instance attributes accordingly, blocks 174, and 176.

The application then creates a browser class instance and sets the appropriate browser class instance attributes accordingly, block 178. In particular, the appropriate browser class instance attributes are set specifying the processing and sorting procedures for the browser items, and the pre-display and post-display canvas painting procedures. For example, processing and sorting procedures may be specified to cause the browser items 154 in FIG. 9, to be assigned to their respective browser item layouts; and pre-display and post-display canvas painting procedures may be specified to cause the graphics 156 and 158 in FIG. 9 to be pointed before and after the pointing of the browser items. The canvas class instance, the window class instance and the generic class instance are implicitly created by creating the browser class instance.

The application then creates the browser item class instances and sets the appropriate browser item class instance attributes accordingly, block 182. The browser items are processed and sorted by the processing and sorting procedures specified by the browser class instance attributes. The browser item class instance attributes may be set by the processing procedure specified. The pre-display canvas painting procedure is invoked before the first browser item is displayed, and the post-display canvas painting procedure is invoked after the "last" browser item is displayed. The "last" browser item displayed may or may not be the last browser item.

As described earlier, the application then registers its callback procedures with the notifier of the window tools, block 182, and calls the notifier to monitor events on its behalf, block 184.

While the present invention has been described in terms of a preferred embodiment, those skilled in the art will recognize that the invention is not limited to the preferred embodiment described. In particular, the method and apparatus of the present invention is not limited to the preferred object oriented approach to organizing the window data and window operations, the preferred centralized approach to events handling for the window system, and the preferred network protocol based and client/server oriented architecture of the window system. The apparatus and method of the present invention can be practiced with modification and alteration within the spirit and scope of the appended claims.

What is claimed is:

1. In a computer system having a display coupled to a central processing unit (CPU) executing a window system and at least one independent application, a method for said at least one independent application to provide collection browsers having browser items for selective browsing by users comprising the steps of:

(a) accepting frame attributes, browser attributes, browser item layout attributes and browser items from said at least one independent application;

(b) generating a frame and displaying said frame on said display by said window system according to said frame attributes provided by said at least one independent application, said frame attributes describing said frame and specifying where said frame is to be displayed on said display;

(c) generating a browser pane within said frame and displaying said browser pane on said display by said window system according to the browser attributes provided by said at least one independent application, said browser attributes describing said browser pane and specifying where said browser pane is to be tiled over said frame;

(d) generating a plurality of identical browser item layouts by said window system according to the browser item layout attributes provided by said at least one independent application, said browser item layout attributes describing said identical browser item layouts and specifying where said identical browser item layouts are to be tiled over said browser pane; and (e) generating the browser items within said identical browser item layouts, one browser item per identical browser item layout, and displaying said browser items on said display by said window system, said browser items being provided by said at least one independent application;

wherein the independent application is relieved of the burden of display maintenance.

2. The method as set forth in claim 1, wherein, said browser attributes comprise selected ones of a browser item layout order attribute, a browser item layout top bottom margin attribute, a browser item layout left right margin attribute, a browser item layout top bottom gap attribute, a browser item layout left right gap attribute, a browser item layout specification attribute, a browser pane width attribute, a browser pane height attribute, a number of browser column attributes, a number of browser row attributes and a browser font attribute.

3. The method as set forth in claim 1, wherein, said browser attributes also provide processing of manipulative information regarding said browser items;

said browser attributes comprise selected ones of a browser processing function specification attribute, a browser item pointer attribute, a browser item count attribute, a browser pane pre-display painting procedure specification attribute, a browser pane post-display painting procedure specification attribute, and a browser item sort procedure specification attribute.

4. The method as set forth in claim 1, wherein, each of said browser items comprises at least one browser item attribute specifying at least one browser item datum key/browser item datum pair; and said step (d) comprises the steps of:

(d.1) generating a plurality of browser item data cells within each of said identical browser item layouts by said window system according to a set of browser item data cell attributes provided by said application, said browser item data cell attributes describing said browser item data cells and specifying where said browser item data cells are to be generated within said identical browser item layouts, and (d.2) generating said browser item data within said browser item data cells, one browser item datum per browser item data cell, and displaying said browser item data on said display by said window system.

5. The method as set forth in claim 4, wherein, said browser item layout attributes comprise a browser item layout orientation attribute, a browser item layout data cell gap attribute, a browser item data cell left right margin, and a browser item data cell top bottom margin;

said browser item data cell attributes comprise a browser item data cell x-axis alignment attribute, a browser item data cell y-axis alignment attribute;

said browser item attributes comprise a browser item glyphs attribute specifying at least one browser item glyph key/browser item glyph datum pair, and a browser item string attribute specifying at least one browser item text string key/browser-item-text string pair.

6. The method as set forth in claim 4, wherein, said browser item layout attributes, said browser item data cell attributes, and said browser item attributes also provide processing of manipulative information regarding said browser items;

said browser item layout attributes comprise a browser item data cell pointer attribute for pointing to a specific browser item data cell and a browser item data cell count attribute for counting number of data cells in the browser item layout;

said browser item data cell attributes comprise a browser item data cell index attribute for indexing data cells within a layout; and said browser item attributes comprise a browser item index attribute for indexing items within a data cell.

7. The method as set forth in claim 1, wherein, said method further comprises the steps of:

(e) receiving inputs from said browser pane by said window system using input devices coupled to said CPU; and (f) forwarding said received inputs by said window system to said application for processing.

8. The method as set forth in claim 7, wherein, said browser attributes further specify procedures for processing said received inputs, said procedures being registered with said window system;

said browser attributes comprise a double click procedure specification attribute, a plurality of drag and drop procedure specification attributes, a menu procedure specification attribute, and a plurality of select and unselect procedure specification attributes;

said procedures comprise a double click procedure, a plurality of drag and drop procedures, a menu procedure, and a plurality of select and unselect procedures; and said window system comprises a system server, a window manager and a plurality of window tools.

9. The method as set forth in claim 7, wherein, said inputs comprise (a) signal inputs generated by switches coupled to said CPU while a cursor is positioned over a portion of said browser pane using a cursor control device coupled to said CPU; and (b) keyboard inputs generated by a keyboard coupled to said CPU while said data pane is activated for keyboard focus, said data pane being activated for keyboard focus by clicking a keyboard focus switch coupled to said CPU while said cursor is positioned over a portion of said browser pane.

10. The method as set forth in claim 9, wherein, said signal inputs comprise:

a browser item select signal indicating the selection of a browser item, said browser item select signal being generated by placing a select switch coupled to said CPU in a select position while said cursor is positioned over a portion of said browser item;

a browser item activate signal indicating the activation of a browser item, said browser item activate signal being generated by clicking an activate switch coupled to said CPU twice; and a plurality of browser item drag signals indicating the dragging of a selected browser item, said browser item drag signals being generated by holding said select switch down while repositioning said cursor using said cursor control device.

11. The method as set forth in claim 1, wherein, said frame attributes being stored in a frame object, said frame object being logically organized as a frame class instance of a frame class, said frame class being logically organized as a subclass to a window class, said window class being logically organized as a subclass to a generic class, said generic class being a root class of a window object class hierarchy;

said browser attributes are stored in a browser object, said browser object being logically organized as a browser class instance of a browser class, said browser class being logically organized as a subclass to a canvas class, said canvas class being logically organized as a subclass to said window class;

said browser item layout attributes are stored in a browser item layout object, said browser item layout object being logically organized as a class instance of a browser item layout class, said browser item layout class being logically organized as a subclass to said generic class;

each of said browser items comprises at least one browser item attribute specifying at least one browser item datum key/browser item datum pair; and said browser item attributes of each of said browser items are stored in a browser item object, said browser item object being logically organized as a class instance of a browser item class, said browser item class being organized as a subclass of said generic class.

12. The method as set forth in claim 11, wherein, said step (d) comprises the steps of:

(d.1) generating a plurality of browser item data cells within each of said identical browser item layouts by said window system according to a set of browser item data cell attributes provided by said application, said browser item data cell attributes describing said browser item data cells and specifying where said browser item data cells are to be generated within said identical browser item layouts, and (d.2) generating said browser item data within said browser item data cells, one browser item datum per browser item data cell, and displaying said browser item data on said display by said window system; and said browser item data cell attributes are stored in a browser item data cell object, said browser item data cell object being organized as a class instance of a browser item data cell class, said browser item data cell class being logically organized as a subclass of said generic class.

13. A computer controlled display system comprising a display coupled to a central processing unit (CPU) executing at least one application, said display system comprising:

(a) display generation means coupled to said CPU comprising a window system for, (i) generating a frame and displaying said frame on said display by said window system according to a set of frame attributes provided by an application, said frame attributes describing said frame and specifying where said frame is to be displayed on said display, (ii) generating a browser pane within said frame and displaying said browser pane on said display according to a set of browser attributes provided by said application, said browser attributes describing said browser pane and specifying where said browser pane is to be tiled over said frame, (iii) generating a plurality of identical browser item layouts within said browser pane according to a set of browser item layout attributes provided by said application, said browser item layout attributes describing said identical browser item layouts and specifying where said identical browser item layouts are to be tiled over said browser pane, and (iv) generating a plurality of browser items within said identical browser item layouts, one browser item per identical browser item layout, and displaying said browser items on said display, said browser items being provided by said application, wherein the display generation means is independent of said application.

14. The apparatus as set forth in claim 13, wherein, said apparatus further comprises:

(b) input devices coupled to said CPU for providing inputs from said browser pane to said window system, said received inputs being forwarded by said window system to said application for processing.

15. The apparatus as set forth in claim 14, wherein, said application comprises a double click procedure, a plurality of drag and drop procedures, a menu procedure, and a plurality of select and unselect procedures for processing said received inputs, said procedures being registered with said window system; and said browser attributes comprise a double click procedure specification attribute, a plurality of drag and drop procedure specification attributes, a menu procedure specification attribute, and a plurality of select and unselect procedure specification attributes identifying said procedures respectively.

16. The apparatus as set forth in claim 14, wherein, said input devices comprise:
   (i) a cursor control device coupled to said CPU for positioning a cursor over a portion of said browser pane;
   (ii) switches coupled to said CPU for generating signal inputs while said cursor is positioned over a portion of said browser pane;
   (iii) a keyboard focus switch coupled to said CPU for activating said data pane for keyboard focus while said cursor is positioned over a portion of said browser pane, said data pane being activated for keyboard focus by clicking said keyboard focus switch; and
   (iv) a keyboard coupled to said CPU for providing keyboard input to said window system while said data pane is activated for keyboard focus.

17. The apparatus as set forth in claim 16, wherein, said switches comprise:
   (a) a select switch coupled to said CPU having a select position for generating,
      (i) a browser item select signal indicating the selection of a browser item, said browser item select signal being generated by placing said select switch in said select position while said cursor is positioned over a portion of said browser item, and
      (ii) a plurality of browser item drag signals indicating the dragging of a selected browser item, said browser item drag signals being generated by holding said select switch down while repositioning said cursor using said cursor control device; and
   (b) an activate switch coupled to said CPU for generating a browser item activate signal indicating the activation of a browser item, said browser item activate signal being generated by clicking said activate switch twice.

18. The apparatus as set forth in claim 13, wherein, said window system comprises a system server, a window manager and a plurality of window tools.

19. The apparatus as set forth in claim 13, wherein,
   said frame attributes being stored in a frame object, said frame object being logically organized as a frame class instance of a frame class, said frame class being logically organized as a subclass to a window class, said window class being logically organized as a subclass to a generic class, said generic class being a root class of a window object class hierarchy;
   said browser attributes are stored in a browser object, said browser object being logically organized as a browser class instance of a browser class, said browser class being logically organized as a subclass to a canvas class, said canvas class being logically organized as a subclass to said window class;
   said browser item layout attributes are stored in a browser item layout object, said browser item layout object being logically organized as a class instance of a browser item layout class, said browser item layout class being logically organized as a subclass to said generic class;
   each of said browser items comprises at least one browser item attribute specifying at least one pair of browser item datum key and browser item datum; and
   said browser item attributes of each of said browser items are stored in a browser item object, said browser item object being logically organized as a class instance of a browser item class, said browser item class being organized as a subclass of said generic class.

20. The apparatus as set forth in claim 13, wherein,
   said window system generates
      (a) a plurality of browser item data cells within each of said identical browser item layouts by said window system according to a set of browser item data cell attributes provided by said application, said browser item data cell attributes describing said browser item data cells and specifying where said browser item data cells are to be generated within said identical browser item layouts, and
      (b) generates said browser item data within said browser item data cells, one browser item datum per browser item data cell, and displays said browser item data on said display by said window system; and
   said browser item data cell attributes are stored in a browser item data cell object, said browser item data cell object being organized as a class instance of a browser item data cell class, said browser item data cell class being logically organized as a subclass of said generic class.

21. The method as set forth in claim 1
   wherein frame attributes, browser attributes, browser item layout attributes and browser items are accepted from a plurality of independent applications.

22. The apparatus as set forth in claim 13
   wherein a plurality of applications provide a plurality of sets of frame attributes, browser attributes, browser item layouts and browser items to the independent display generation means.

* * * * *

UNITED STATES PATENT AND TRADEMARK OFFICE
CERTIFICATE OF CORRECTION

PATENT NO.   : 5,630,042
DATED        : May 13, 1997
INVENTOR(S)  : McIntosh et al.

It is certified that error appears in the above-identified patent and that said Letters Patent is hereby corrected as shown below:

<u>Title page,</u>
Item [56], OTHER PUBLICATIONS, please insert the following references:
-- P. Dewan, "An Inheritance Model For Supporting Flexible Displays Of Data Structures", Software Practice & Experience, vol. 21, no. 7, July 1991, Chichester, GB, p.719-738
Ossher, H., "Multi-dimensional Organization & Browsing Of Object-Oriented Systems, Int. Conf. on Computer Languages, 3/12/90, NY, IEEE, US, p.128-135
Udagawa, Y., "Implementation & Evaaluation of a Browsing Algorithm For Design Applicatiions", Proc. 7th Int. Conf. On Data Eng, 4/8/91, IEEE, Los Alamitos, US, p.70-79
Laenens, E., et al., "Browsing a la carte in Objected Oriented Databased", Computer Journal, vol. 32, no. 4, August 1989, London, GB, p.333-340 --

Signed and Sealed this

Twenty-first Day of May, 2002

*Attest:*

*Attesting Officer*

JAMES E. ROGAN
*Director of the United States Patent and Trademark Office*